(12) United States Patent
Aoki

(10) Patent No.: US 7,985,028 B2
(45) Date of Patent: Jul. 26, 2011

(54) OPTICAL FIBER SPLICING TECHNIQUE AND OPTICAL MEMBER UNIT

(75) Inventor: Fumio Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 12/408,281

(22) Filed: Mar. 20, 2009

(65) Prior Publication Data
US 2009/0324178 A1    Dec. 31, 2009

(30) Foreign Application Priority Data
Jun. 30, 2008  (JP) .................................. 2008-170592

(51) Int. Cl.
*G02B 6/255* (2006.01)
(52) U.S. Cl. ........................................ 385/96; 385/39
(58) Field of Classification Search .................. None
See application file for complete search history.

(56) References Cited

U.S. PATENT DOCUMENTS

| | | | | |
|---|---|---|---|---|
| 4,478,486 A | * | 10/1984 | Fentress et al. | 385/135 |
| 4,861,134 A | * | 8/1989 | Alameel et al. | 385/135 |
| 5,469,526 A | * | 11/1995 | Rawlings | 385/135 |
| 6,144,790 A | * | 11/2000 | Bledin | 385/121 |
| 6,314,219 B1 | * | 11/2001 | Zhang et al. | 385/32 |
| 6,332,722 B1 | * | 12/2001 | Meli et al. | 385/98 |
| 6,741,785 B2 | * | 5/2004 | Barthel et al. | 385/135 |
| 6,996,301 B2 | | 2/2006 | Arima et al. | |
| 7,269,320 B2 | * | 9/2007 | Herbst | 385/100 |
| 7,296,940 B2 | | 11/2007 | Shukunami et al. | |
| 7,428,350 B1 | * | 9/2008 | Varadarajan et al. | 385/13 |
| 7,773,841 B2 | * | 8/2010 | Varadarajan et al. | 385/32 |
| 2007/0036499 A1 | | 2/2007 | Shukunami et al. | |
| 2008/0317426 A1 | | 12/2008 | Shukunami et al. | |

FOREIGN PATENT DOCUMENTS

| | | |
|---|---|---|
| JP | 2004-85920 | 3/2004 |
| WO | 2005/103779 A1 | 11/2005 |

\* cited by examiner

*Primary Examiner* — Mike Stahl
(74) *Attorney, Agent, or Firm* — Fujitsu Patent Center

(57) ABSTRACT

According to an optical fiber splicing technique in which optical fibers F11 and F12 respectively connected to optical members 3 and 4 of an optical member unit are connected by fusion splicing, the plurality of optical fibers F11 and F12 and a looped turn-around fiber F21 are positioned facing each other and connected by fusion splicing, to connect the plurality of optical fibers F11 and F12 with each other.

17 Claims, 9 Drawing Sheets

OPTICAL FIBER SPLICING TECHNIQUE AND OPTICAL MEMBER UNIT

CROSS-REFERENCE TO RELATED APPLICATION

This application is based upon and claims the benefit of priority of the prior Japanese Patent Application No. 2008-170592, filed on Jun. 30, 2008, the entire contents of which are incorporated herein by reference.

FIELD

The embodiments discussed herein are related to an optical fiber splicing technique and an optical member unit in which optical fibers positioned facing each other are connected by fusion splicing.

BACKGROUND

Conventionally, an optical fiber that transmits an optical signal has been used for connecting optical members such as a laser diode, a photodiode, a coupler, an isolator and the like (see, for example, International Publication Pamphlet No. 05/103779).

FIG. 4A and FIG. 4B are schematic diagrams for illustrating a conventional optical fiber splicing technique.

In FIG. 4A, one end of an optical fiber F is connected to optical members 42-47 such as a laser diode, a photodiode, a coupler, an isolator and the like mounted on an optical member unit 41. Another end of the optical fiber F is drawn outside the optical member unit 41 in which the optical members are stored. The optical fibers F are held by a pair of fiber holders 49 in a fusion splicing machine 48 such that the optical fibers F to be connected face each other.

Then, as depicted in FIG. 4B, in the optical fibers F connected by fusion splicing by the fusion splicing machine 48, the part F' drawn outside is bent and stored in the storage area Meanwhile, as the sizes of various products have been reduced recently, there has been a need for mounting optical members with a narrow pitch. However, an optical fiber cannot be folded, and a certain bending R (for example equal to or more than R 30 mm) needs to be secured.

For this reason, as depicted in FIG. 5A, when connecting optical fibers F extending from adjacent optical members 52 and 53 to the same direction (to the right in FIG. 5A) by fusion splicing while making them face each other in fiber holders 54, the optical fiber F for example connected to the optical member 53 has to be turned around to a large extent, in order to secure a certain bending R for the optical fiber F.

In addition, with the mounting position of the members as that for the optical member unit 51' depicted in FIG. 5B, the optical fiber F (the optical fiber connected to the optical member 52' is not depicted in the drawing) needs to be turned around in a more complicated way, in order to draw the optical fiber F connected to the optical member 53 outside towards fiber holders 54.

There has been a problem that, forming work conducted while making the optical fiber turn around in a complicated way as described above leads to a poor forming workability.

SUMMARY

According to an aspect of the invention, an optical fiber splicing technique in which optical fibers connected to optical members of an optical member unit are connected by fusion splicing includes connecting a plurality of optical fibers with each other, by connecting the plurality of optical fibers and a looped turn-around fiber positioned facing each other by fusion splicing.

Preferably, the looped turn-around fiber is configured so as to be able to be stored in a storage area in the optical member unit; one ends of the plurality of optical fibers of which another ends are connected to the optical members are extracted from the optical member unit to an external area; and the extracted plurality of optical fibers and the looped turn-around fiber are positioned facing each other and connected by fusion splicing, to connect the plurality of optical fibers with each other.

More preferably, one ends of the plurality of optical fibers of which another ends are connected to the optical members are extracted from the optical member unit to an external area in the same direction with each other; the one ends of the extracted plurality of the optical fibers are held collectively; and the held plurality of optical fibers and the turn-around fiber are positioned facing each other and connected by fusion splicing, to connect the plurality of optical fibers with each other.

Preferably, the looped turn-around fiber is formed such that at least a shape of a loop part correspond to a shape of the storage area.

According to an aspect of the invention, an optical member unit includes a plurality of optical members; a plurality of optical fibers of which one ends are connected to the optical members; and a looped turn-around fiber connected to another ends of the plurality of optical fibers by fusion splicing, to connect the plurality of optical fibers with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an optical fiber splicing technique and an optical member unit according to embodiments of the present invention will be explained with reference to accompanying drawings.

An Embodiment

Figure 1A:
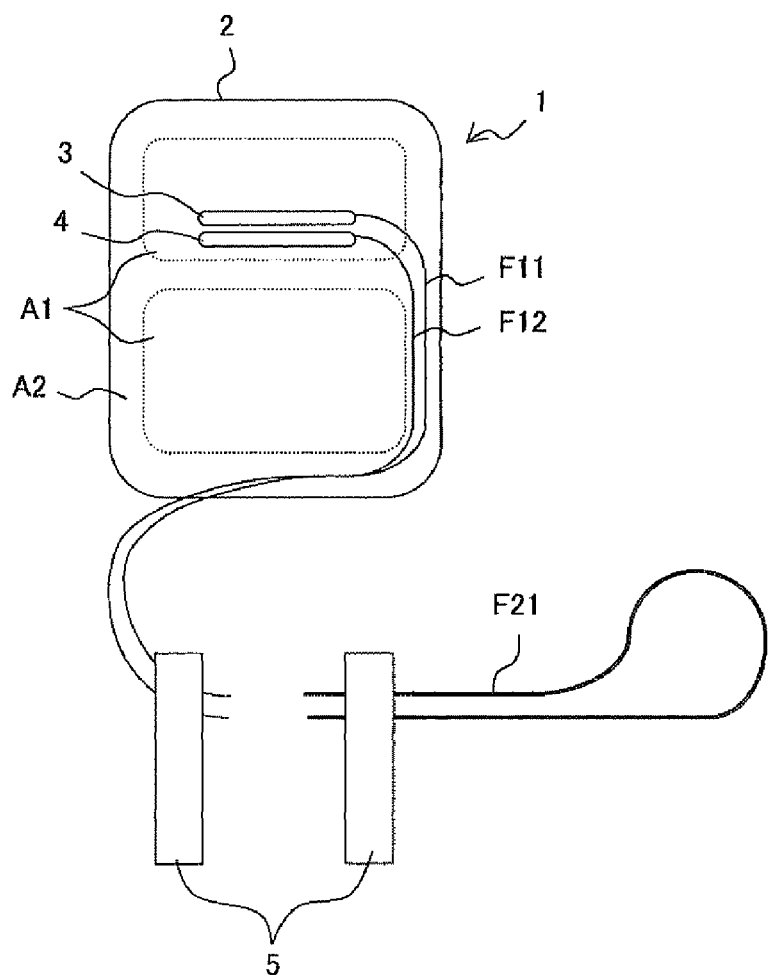
FIG. 1A is a schematic diagram (part 1) for illustrating an optical fiber splicing technique according to an embodiment of the present invention.
Figure 1B:
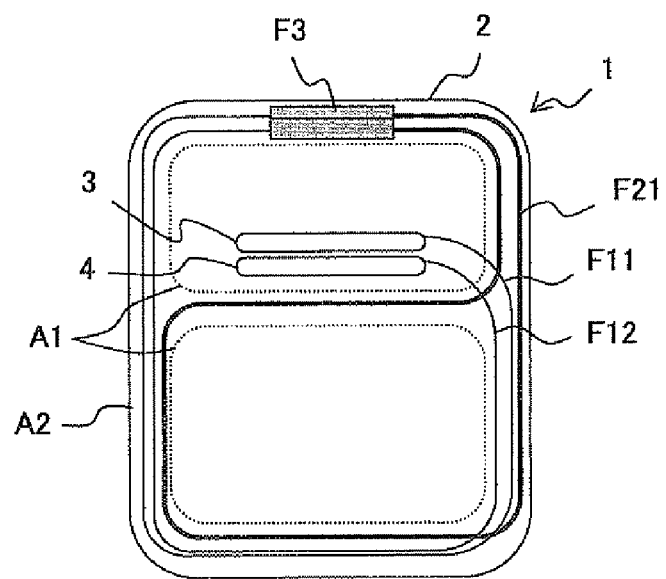
FIG. 1B is a schematic diagram (part 2) for illustrating the optical fiber splicing technique according to the embodiment of the present invention.

FIG. 1A and FIG. 1B are schematic diagrams for illustrating an optical fiber splicing technique according to an embodiment of the present invention.

An optical member unit 1 depicted in FIG. 1A includes a chassis 2, optical members 3 and 4 such as a coupler, an isolator and the like disposed in a member mounting area A1 of the chassis 2, and optical fibers F11, F12 and a looped turn-around fiber (optical fiber) F21 that are connected using an optical fiber splicing technique described later.

While a fiber storage area A2 has an approximately figure-of-eight shape surrounding two member mounting areas A1 in the present embodiment, the shape does not need to be the figure of eight, as long as the optical fibers F11, F12 and F21 can be stored in the area.

When forming the optical fibers F11 and F12, first, one ends of the optical fibers F11 and F12 of which another ends are respectively connected to the optical members 3 and 4 are extracted to an external area (that is, outside the chassis 2 of the optical member unit 1), through the shortest route along the fiber storage area (storage area) A2. At this time, the optical fibers F11 and F12 are extracted to the external area from the same direction.

One of fiber holders 5 of a fusion splicing machine not depicted in the drawings holds the extracted optical fibers F11 and F12 collectively such that the optical fibers F11 and F12 face both ends of a looped turn-around fiber F21 (illustrated with a thick solid line for explanatory purpose) that has been prepared in advance, while another of the fiber holder 5 holds the both ends of the turn-around fiber F21.

Then, the optical fibers F11, F12 and the both ends of the turn-around fiber F21 are connected by fusion splicing. Accordingly, the extracted optical fibers F11 and F12 are connected with each other. Consequently, the optical members 3 and 4 are connected.

After the optical fibers F11, F12 and the turn-around fiber F21 are connected by fusion splicing, the parts of the optical fibers F11 and F12 extracted to the external area and the turn-around fiber F21 connected to the optical fibers F11 and F12 through a fiber fusion part F3 are bent and stored in the fiber storage area A2, as depicted in FIG. 1B. For this reason, the turn-around fiber F21 needs to be configured to have a length or width that can be stored in the fiber storage area A2 in the optical member unit 1.

At this time, because of the looped shape of the turn-around fiber F21, it is to be stored in the fiber storage area A2 while its certain bending R (for example, equal to or more than R 30 mm) is maintained.

While described above for the present embodiment is an example of connecting two optical fibers F11, F12 and one turn-around fiber positioned facing each other by fusion splicing, the forming work can be further simplified by positioning more optical fibers and turn-around fibers facing each other in the fiber holders 5.

In the present embodiment described above, the plurality of optical fibers F11, F12 respectively connected to the optical members 3 and 4 and the looped turn-around fiber F21 are connected by fusion splicing, to connect the plurality of optical fibers F11 and F12 with each other. Therefore, the trouble of making the optical fibers F11 and F12 turn around in a complicated way can be eliminated. Thus, according to the present embodiment, the forming work of the optical fibers F11 and F12 can be simplified.

In addition, in the present embodiment, one ends of the plurality of optical fibers F11 and F12 of which another ends are respectively connected to the optical members 3 and 4 are extracted to an external area outside the chassis 2; the extracted plurality of optical fibers F11, F12 and the both ends of the looped turn-around fiber 21 are positioned facing each other and connected by fusion splicing, to connect the plurality of the optical fibers F11 and F12 with each other; and the plurality of optical fibers F11, F12 and the turn-around fiber F21 are stored in the fiber storage area. Therefore, the forming work can be simplified effectively.

In addition, in the present embodiment, the plurality of optical fibers F11 and F12 are extracted from the same direction to the external area, and these extracted plurality of optical fibers F11 and F12 are held by the fiber holder 5 collectively. Therefore, the forming work can be simplified more effectively.

Another Embodiment

The present embodiment is same as the embodiment described above except that a loop part F22a. of a turn-around fiber is formed with a shape corresponding to the shape of a fiber storage area A2. Therefore, detail descriptions are omitted.

Figure 2:
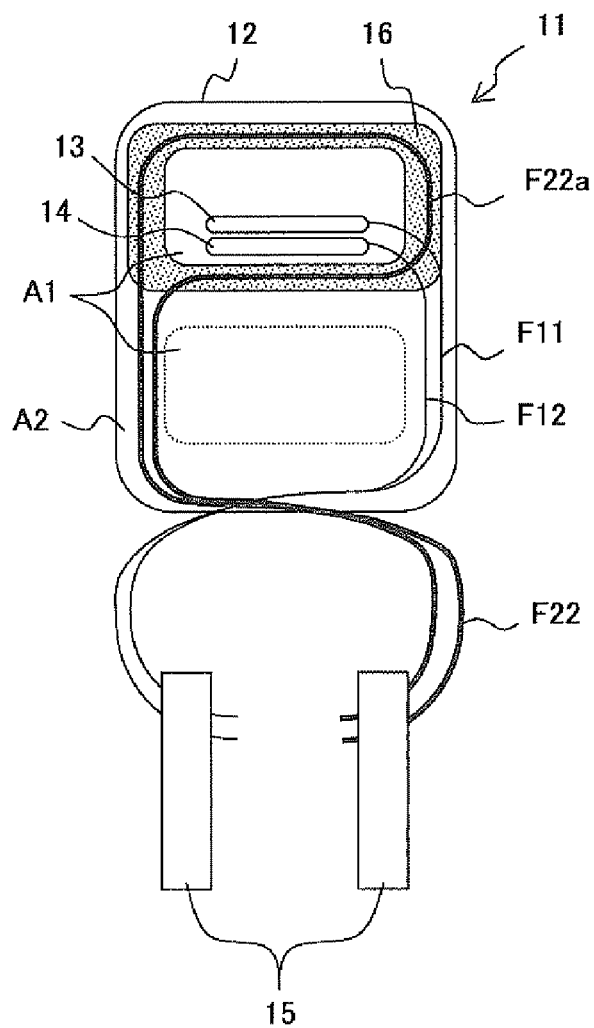
FIG. 2 is a diagram for illustrating an optical fiber splicing technique according to another embodiment of the present invention.

FIG. 2 is a schematic diagram for illustrating an optical fiber splicing technique according to an other embodiment of the present invention.

Figure 3A:
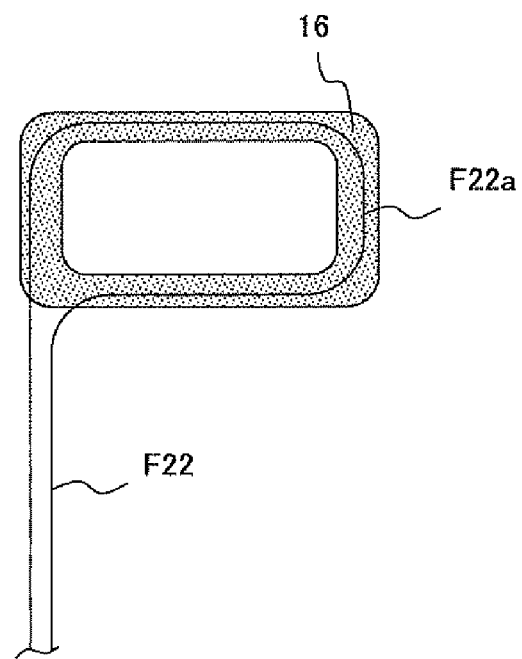
FIG. 3A is a schematic diagram illustrating the main part of a turn-around fiber according to the other embodiment of the present invention.

FIG. 3A is a schematic diagram illustrating the main part of a turn-around fiber F22 used for the optical fiber splicing technique according to the other embodiment of the present invention.

An optical member unit 11 depicted in FIG. 2 includes a chassis 12, optical members 13 and 14 such as a coupler, an isolator and the like disposed in a member mounting area A1 of the chassis 12, and optical fibers F11, F12 and a looped turn-around fiber F22 that are connected using an optical fiber splicing technique described later.

In the looped fiber F22, the loop part F22a. is fixed to a fiber sheet 16 (illustrated as a dotted area for explanatory purpose) that is depicted also in FIG. 3A. For example, a resin sheet may be used for the fiber sheet 16, to which the loop part F22a. is fixed by, for example, bonding. In the case of fixing the loop part F22a, the loop part F22a. is formed with an approximately same shape as the shape of a part of the fiber storage area A2.

Figure 3B:
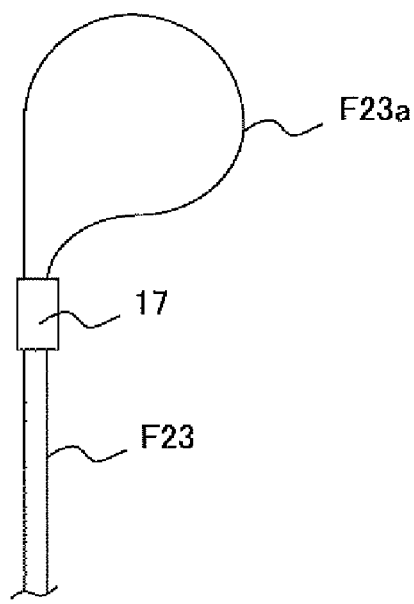
FIG. 3B is a schematic diagram illustrating the main part of a turn-around fiber according to a modification example of the other embodiment of the present invention.
Figure 4A:
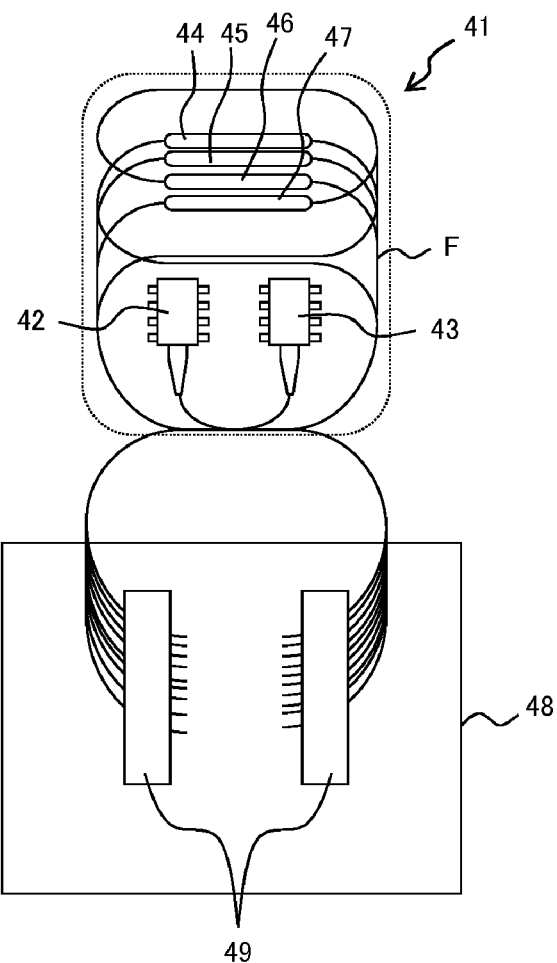
FIG. 4A is a schematic diagram (part 1) for illustrating a conventional optical fiber splicing technique.
Figure 4B:
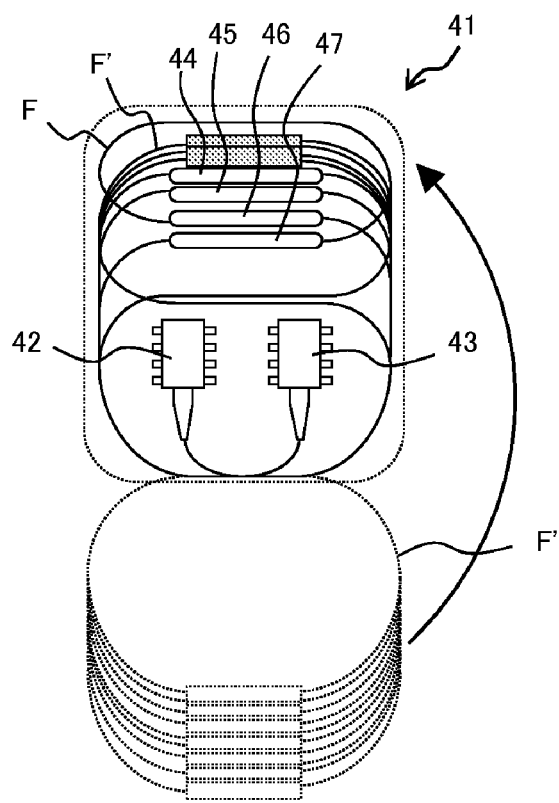
FIG. 4B is a schematic diagram (part 2) for illustrating a conventional optical fiber splicing technique.
Figure 5:
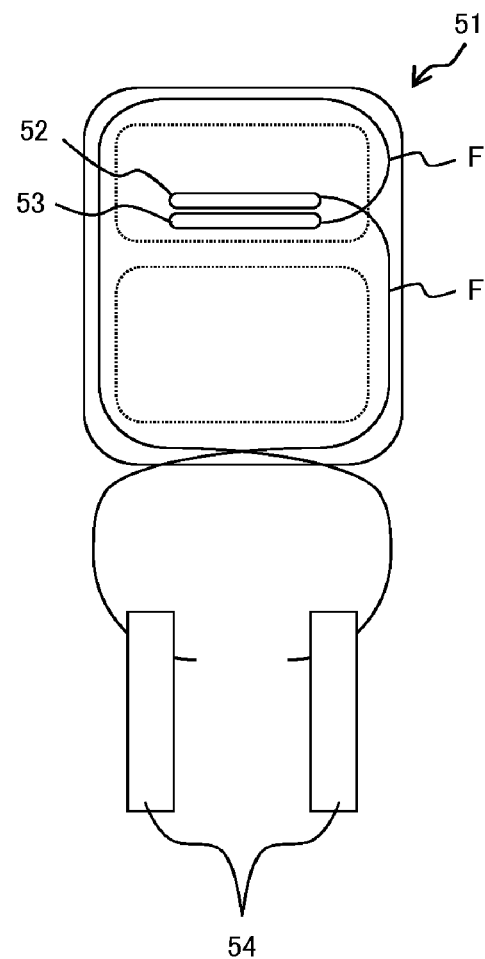
FIG. 5A is a schematic diagram (part 3) for illustrating a conventional optical fiber splicing technique.
FIG. 5B is a schematic diagram (part 4) for illustrating a conventional optical fiber splicing technique.
Figure 5B:
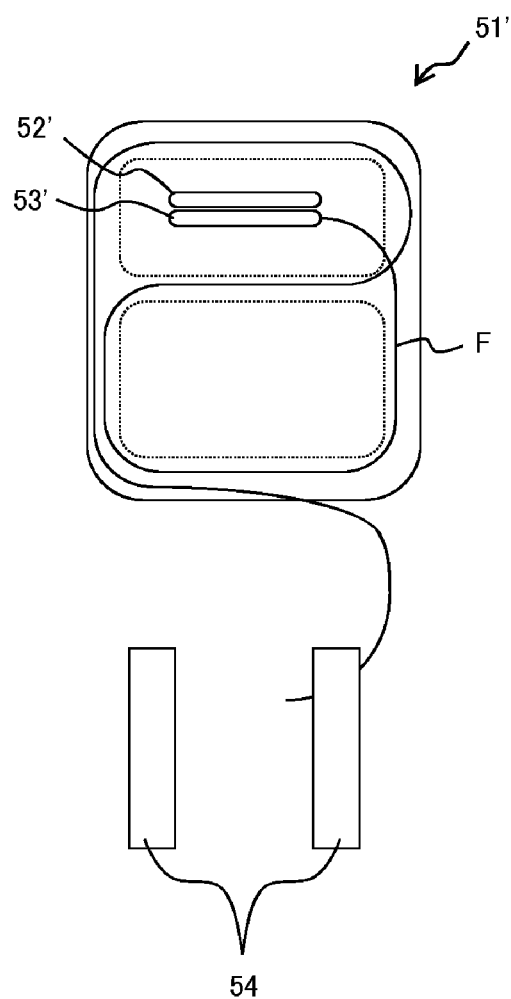

Methods to form the loop part F22a. with a shape corresponding to the shape of the fiber storage are a A2 as depicted in FIG. 2 include, besides making the shape approximately the same as a part of the fiber storage area A2 as depicted in FIG. 2, for example, as illustrated with a turn-around fiber F23 in FIG. 3B, ones such as to make the size of a loop part F23a. such that it can be stored in the fiber storage area A2, by partly bonding (see a bonding part 17) the root of the loop part F23.

When forming the optical fibers F11 and F12, in the same manner as the embodiment described earlier, one ends of the optical fibers F11 and F12 of which another ends are respectively connected to the optical members 13 and 14 are extracted to an external area from the same direction, through the shortest route along the fiber storage area A2.

Then, the optical fibers F11, F12 and the looped fiber F22 held in fiber holders 15 are positioned facing each other and connected by fusion splicing, which are then bent and stored in the fiber storage area A2.

Also in the present embodiment described above, the plurality of optical fibers F11 and F12 respectively connected to the optical members 13 and 14 are connected with the looped turn-around fiber F22 (F23) by fusion splicing, to connect the plurality of optical fibers F11 and F12 with each other. Therefore, the trouble of making the optical fibers F11 and F12 turn around in a complicated way can be eliminated. Thus, according to the present embodiment, the forming work of the optical fibers F11 and F12 can be simplified as well.

In addition, in the present embodiment, the turn-around fibers F22 and F23 are formed such that at least the shapes of the loop parts F22a. and F23a. correspond to the shape of the fiber storage area A2. Therefore, the forming work can be simplified further.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical fiber splicing method, comprising:
   connecting a plurality of optical fibers with each other, by connecting the plurality of optical fibers and a looped turn-around fiber positioned facing each other by fusion splicing, wherein the looped turn-around fiber is configured so as to be able to be stored in a storage area in an optical member unit, and the storage area surrounds a member mounting area in which at least one of optical members connected to the optical fibers is disposed.

2. The optical fiber splicing method according to claim 1, further comprising:
   extracting one ends of the plurality of optical fibers of which another ends are connected to the optical members from the optical member unit to an external area;
   positioning the extracted plurality of optical fibers and the looped turn-around fiber to face each other; and
   connecting, by fusion splicing, the plurality of optical fibers with each other.

3. The optical fiber splicing method according to claim 2, wherein
   the one ends of the plurality of optical fibers of which the another ends are connected to the optical members are extracted from the optical member unit to the external area in the same direction with each other, through the shortest route along the storage area;
   the one ends of the extracted plurality of the optical fibers are held collectively;
   the held plurality of optical fibers and the turn-around fiber are positioned facing each other and connected by fusion splicing, to connect the plurality of optical fibers with each other; and the looped turn-around fiber is formed such that at least a shape of a loop part corresponds to a shape of the storage area by fixing the loop part to a fiber sheet or by partly bonding the root of the loop part.

4. An optical member unit comprising:
   a plurality of optical members;
   a plurality of optical fibers of which one ends are connected to the optical members; and
   a looped turn-around fiber connected to another ends of the plurality of optical fibers by fusion splicing, to connect the plurality of optical fibers with each other, wherein
   the looped turn-around fiber is configured so as to be able to be stored in a storage area in the optical member unit; and
   the storage area surrounds a first member mounting area in which at least one of the optical members is disposed.

5. The optical member unit according to claim 4, wherein
   the storage area extends partially around a second member mounting area in which at least one of the optical members is disposed.

6. The optical member unit according to claim 4, comprising:
   a resin fiber sheet in the storage area of the first member mounting area.

7. An optical member unit comprising:
   a chassis defining a storage area;
   a plurality of optical members;
   a plurality of optical fibers including first ends, respectively connected to the optical members;
   a fiber connecting part stored in the chassis; and
   a looped turn-around fiber connected to second ends of the plurality of optical fibers by the fiber connecting part, to connect the plurality of optical fibers with each other, the looped turn-around fiber being positioned in the storage area of the chassis, wherein
   the storage area surrounds a first member mounting area in which at least one of the optical members is positioned.

8. The optical member unit according to claim 7, wherein
   the chassis includes a first part wherein the looped turn-around fiber is connected to the second ends of the plurality of optical fibers.

9. The optical member unit according to claim 8, wherein
   the chassis includes a second part wherein the looped turn-around fiber extends within an entire extent of the storage area in the second part.

10. The optical member unit according to claim 9, wherein
    the first part and the second part form a figure-of-eight shape.

11. The optical member unit according to claim 10, wherein
    the first part surrounds the first member mounting area.

12. The optical member unit according to claim 11, wherein the second part surrounds a second member mounting area.

13. The optical member unit according to claim 12, wherein
    the plurality of optical members are positioned in the first member mounting area.

14. The optical member unit according to claim 13, wherein the plurality of optical fibers extend only partly around a periphery of said storage area.

15. The optical member unit according to claim 14, wherein
the fiber connecting part is to fusion splice the looped turn-around fiber to the second ends of the plurality of optical fibers.

16. The optical member unit according to claim 15, wherein
the first part includes a resin fiber sheet to hold the looped turn-around fiber.

17. The optical member unit according to claim 7, wherein
the fiber connecting part is to fusion splice the looped turn-around fiber to the second ends of the plurality of optical fibers.

* * * * *